May 4, 1937. H. DREW ET AL 2,079,399
WIND SCREEN WIPER
Filed Aug. 13, 1934
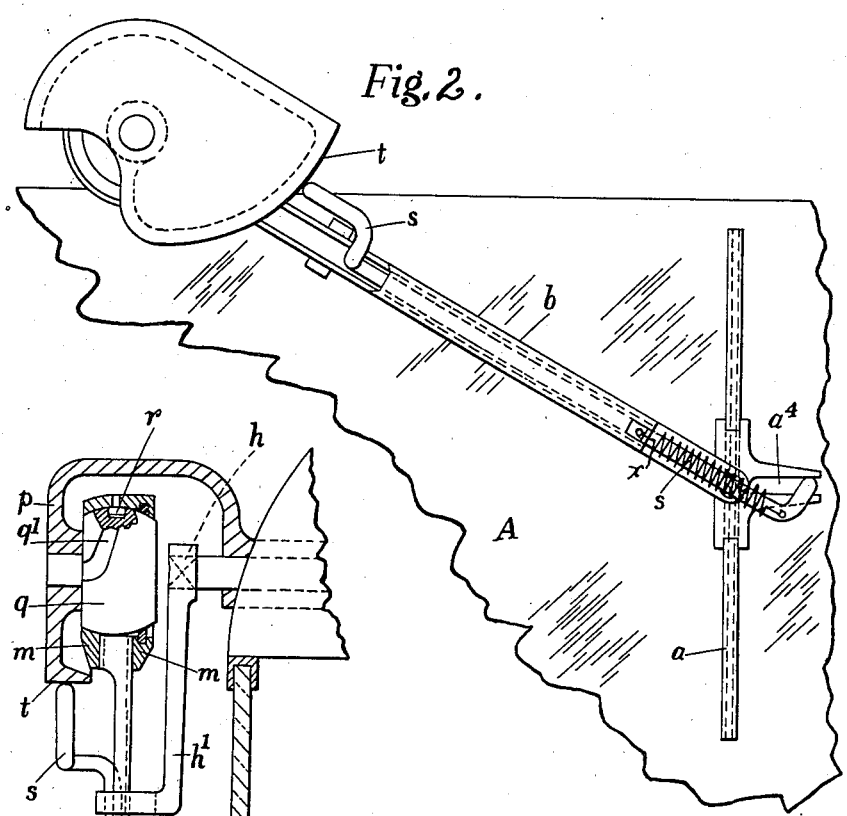
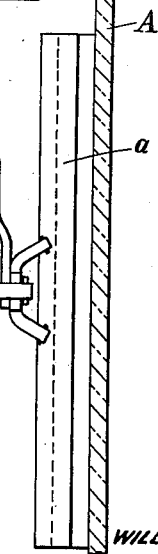
INVENTORS
HAROLD DREW, WILLIAM OSCAR KENNINGTON,
WILLIAM WINDLEY CONSTANTINE & WILLIAM STANLEY ASCOUGH
Blackmore, Spencer & Flink
ATTORNEYS Patented May 4, 1937

2,079,399

UNITED STATES PATENT OFFICE 2,079,399

WIND SCREEN WIPER

Harold Drew, Luton, William Oscar Kennington, William Windley Constantine, and William Stanley Ascough, London, England, assignors to General Motors Corporation, Detroit, Mich., a corporation of Delaware Application August 13, 1934, Serial No. 739,550
In Great Britain August 21, 1933

2 Claims. (Cl. 15—255)

This invention relates to windscreen wipers, and has for its object to provide means whereby the front surface of a curved windscreen in a motor car may be kept clear of moisture.

Ordinary windscreens are flat and many devices have been produced for moving a form of squeegee over a flat surface of glass to keep the glass clear in spite of condensation or rain upon it, but such devices will not operate to keep clear a curved surface of glass.

According to the present invention means are provided in combination with a curved windscreen which comprise a wiper blade and means to move the wiper blade through an arc approximately coincident with the windscreen.

With curved windscreens having a single axis of curvature, the wiper blade, in accordance with our invention, is mounted so as to maintain a position parallel to the axis of curvature of the windscreen during its wiping movement.

In the accompanying drawing wherein the preferred form of our invention is illustrated:

Fig. 1 is a fragmentary sectional view showing our invention upon a plane at right angles to the windscreen.

Fig. 2 is a fragmentary view showing our invention as seen from a position in front of the windscreen.

In the construction shown a casing $p$ extends forwardly in front of the usual windscreen wiper mechanism and carries mounted co-axially therewith a fixed ball-shaped element $q$. This element is closely adjacent to the end of the spindle $h$ of the windscreen wiper mechanism. Upon the exterior of the ball shaped element $q$ there is mounted, by means of a socket $m$ a tubular wiper arm $b$ which depends out of the casing $p$ and is embraced a short distance below the casing by a fork $h'$ mounted on the spindle of the wiper mechanism.

By this fork $h'$ the arm $b$ is capable of being oscillated to and fro, but simultaneous movements of the arm towards and from the surface of the windscreen are not interfered with. Within the socket at the top there is a cam roller $r$ and the ball-shaped element $q$ on which the socket $m$ moves is formed with a cam groove $q'$ which is so shaped that the lower end of the wiper arm $b$ is maintained throughout its travel at a uniform distance from the windscreen A. At the bottom of the arm a wiper blade $a$ is pivoted and is maintained in a vertical position parallel with the axis of curvature of the windscreen and in contact therewith during its reciprocating movement.

The pivoting of the wiper blade $a$ to the lower end of the wiper arm $b$ is of universal character and means are provided to keep the wiper blade parallel with the axis of curvature of the windscreen during the whole length of its sweep. Such means comprise a push rod $s$ sliding within the tubular wiper arm $b$ and engaging a cam $t$ at its upper end while its lower end engages by suitable means on offset portion of the wiper blade. This cam as shown is preferably on the lower part of the casing $p$ which carries the ball-shaped member $q$, in which case the push rod $s$ is bent laterally through a longitudinal slot in the front of the wiper arm and the projecting portion is shaped to engage the cam. As shown in Fig. 1, the wiper blade $a$ is provided with a slot $a^4$, and the free end of the push rod $s$ is bent so as to extend into this slot, the purpose of this construction being to maintain the wiper blade in a vertical position as the same moves back and forth over the surface of the windscreen, the push rod as explained being operated by the cam $t$ which acts upon the upper end thereof. The upper end of the push rod $s$ is held in contact with the cam $t$ by a tension spring $x$ acting between the lower end of said rod and the tubular wiper arm $b$ as shown.

We claim:—

1. In windscreen wiper mechanism of the class described for use with a curved windscreen; an upper stationary casing; an oscillating wiper carrying arm pivotally supported from said casing and depending therefrom; a reciprocating wiper blade carried by and pivotally connected with the lower end of said arm; cam mechanism carried by said casing and cooperating with said wiper carrying arm for moving the lower end thereof toward and from the windscreen, to thereby maintain said wiper blade in contact with said windscreen during the reciprocating movement thereof; a cam carried by said casing for maintaining said wiper blade parallel with the axis of curvature of the windscreen during its reciprocating movement; a reciprocating push rod operated by said cam and extending along and slidably mounted upon said wiper carrying arm; means whereby the lower end of said push rod is operatively connected with said wiper blade to maintain the same parallel with the axis of curvature of the windscreen as aforesaid; and means operatively connected with said oscillating wiper carrying arm for imparting oscillatory movement thereto.

2. In windscreen wiper mechanism of the class described for use with a curved windscreen; an upper stationary casing; an oscillating wiper carrying arm pivotally supported from said casing and depending therefrom; a reciprocating wiper blade carried by and pivotally connected with the lower end of said arm; cam mechanism carried by said casing and cooperating with said wiper carrying arm for moving the lower end thereof toward and from the windscreen, to thereby maintain said wiper blade in contact with said windscreen during the reciprocating movement thereof; a cam carried by said casing; a reciprocating push rod operated by said cam and extending along and slidably mounted upon said wiper carrying arm; means whereby the lower end of said push rod is operatively connected with said wiper blade to oscillate said wiper blade about the pivotal connection aforesaid between said blade and the lower end of said oscillating wiper carrying arm; and means operatively connected with said oscillating wiper carrying arm for imparting oscillatory movement thereto.

HAROLD DREW.
WILLIAM OSCAR KENNINGTON.
WILLIAM WINDLEY CONSTANTINE.
WILLIAM STANLEY ASCOUGH.